(12) United States Patent
Huang (10) Patent No.: US 9,197,708 B2
(45) Date of Patent: Nov. 24, 2015

(54) METHOD AND ARRANGEMENT FOR MEDIATING WEB SERVICES USING UDDI

(75) Inventor: Vincent Huang, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 783 days.

(21) Appl. No.: 12/530,950

(22) PCT Filed: Mar. 14, 2007

(86) PCT No.: PCT/SE2007/050151
§ 371 (c)(1),
(2), (4) Date: Sep. 11, 2009

(87) PCT Pub. No.: WO2008/111884
PCT Pub. Date: Sep. 18, 2008

(65) Prior Publication Data
US 2010/0100525 A1    Apr. 22, 2010

(51) Int. Cl.
*G06F 17/40* (2006.01)
*H04L 29/08* (2006.01)
*H04L 29/06* (2006.01)
*H04L 12/851* (2013.01)

(52) U.S. Cl.
CPC ............... *H04L 67/16* (2013.01); *H04L 67/02* (2013.01); *H04L 67/322* (2013.01); *H04L 47/2425* (2013.01); *H04L 47/2441* (2013.01); *H04L 65/80* (2013.01); *H04L 67/30* (2013.01); *H04L 67/327* (2013.01)

(58) Field of Classification Search
CPC .............................. H04L 67/322; H04L 65/80
USPC .......................................... 707/609; 709/203
See application file for complete search history.

(56) References Cited

U.S. PATENT DOCUMENTS

| 6,351,770 | B1 * | 2/2002 | Li et al. ........................ 709/225 |
| 6,449,650 | B1 | 9/2002 | Westfall |
| 7,343,428 | B2 * | 3/2008 | Fletcher et al. ............... 709/250 |
| 7,904,561 | B2 * | 3/2011 | Chan et al. ..................... 709/226 |

(Continued)

FOREIGN PATENT DOCUMENTS

| CN | 1777190 A | 5/2006 |
| WO | 2004102925 A1 | 11/2004 |

(Continued)

OTHER PUBLICATIONS

Lee, KangChan, et al., "QoS for Web Services: Requirements and Possible Approaches," W3C Working Group Note, Nov. 25, 2003.

*Primary Examiner* — Sangwoo Ahn (57) ABSTRACT

The present invention relates to a UDDI server and method in a UDDI server for mediating Web services provided by a number of service providers to a number of service requesters. The UDDI server according to the present invention is adapted to provide support for taking dynamic quality of service into account in the mediation of Web services. The UDDI server comprises a Web service register which includes data sets for storing QoS status information. The QoS status information is information on the current QoS that an associated Web service can offer to a service requester. The QoS status information stored in the data sets is updated periodically based on dynamic service status information received from the service providers. The UDDI server may optionally include a decision making function for selecting a Web service that satisfy a set of QoS requirements of a service requester.

22 Claims, 6 Drawing Sheets

(56) References Cited

U.S. PATENT DOCUMENTS

| | | | |
|---|---|---|---|
| 7,908,190 B2* | 3/2011 | Enenkiel | 705/31 |
| 7,975,037 B2* | 7/2011 | Tai et al. | 709/223 |
| 2004/0078470 A1 | 4/2004 | Baumeister | |
| 2004/0098606 A1 | 5/2004 | Tan et al. | |
| 2004/0236633 A1 | 11/2004 | Knauerhase | |
| 2005/0198206 A1* | 9/2005 | Miller et al. | 709/219 |
| 2005/0235053 A1* | 10/2005 | Sano | 709/223 |
| 2005/0262189 A1* | 11/2005 | Mamou et al. | 709/203 |
| 2006/0015631 A1* | 1/2006 | Bregant-Belin et al. | 709/230 |
| 2006/0047742 A1* | 3/2006 | O'Neill et al. | 709/203 |
| 2006/0206440 A1* | 9/2006 | Anderson et al. | 705/500 |
| 2006/0265499 A1 | 11/2006 | Menasce | |
| 2007/0100981 A1* | 5/2007 | Adamczyk et al. | 709/223 |
| 2007/0250611 A1* | 10/2007 | Bhogal et al. | 709/223 |
| 2008/0065402 A1* | 3/2008 | Sanamrad | 705/1 |
| 2010/0100525 A1* | 4/2010 | Huang | 707/609 |

FOREIGN PATENT DOCUMENTS

| | | |
|---|---|---|
| WO | WO 2005114411 A1 | 12/2005 |
| WO | 2006125705 A1 | 11/2006 |
| WO | 2007044178 A2 | 4/2007 |
| WO | WO 2007044178 A2 | 4/2007 |

\* cited by examiner

METHOD AND ARRANGEMENT FOR MEDIATING WEB SERVICES USING UDDI

TECHNICAL FIELD

The present invention relates to a method and arrangement for support for Web services, and more particularly, to management of dynamic quality of service (QoS) for Web services.

BACKGROUND

The World Wide Web Consortium (W3C) has defined a Web service as a software system designed to support interoperable Machine to Machine interaction over a network. Web services are frequently just application programming interfaces (API) that can be accessed over a network, such as the Internet, and executed on a remote system hosting the requested services. Examples of Web services include e.g. a booking service for air tickets provided by a travel agency over the Internet, a call set-up service for setting up a HSDPA (High-Speed Downlink Packet Access) connection provided by a 3G operator, and a service for setting up a multimedia session between two end users.

A number of different protocols and formats has been developed to manage Web services.

UDDI (Universal Description, Discovery, and Integration) is a protocol for publishing and discovering metadata about Web services. A UDDI server acts as a service broker for Web services. Service providers can register information about their services in the UDDI server and service requesters can contact the UDDI server to find a suitable service based on the information stored in the UDDI server.

WSDL (Web Services Description Language) is an XML (extensible Markup Language) format that is used for describing a Web service to be provided. A service requester may for instance receive a WSDL-file from a UDDI server or from a service provider as the result of a service request. The WSDL-file will explain the details that the service requester needs to know in order to use the Web service.

SOAP (Simple Object Access Protocol) is an XML-based message envelope format that can be used for communication between e.g. a service provider and a service requester.

A service provider who has implemented a service for open use by others can post information about the service on a UDDI server. This means that information on the service is stored in the UDDI server and searchable when a service requester contacts the UDDI server in the search for a desired service. If one or several suitable services are found when the UDDI server receives a service request it can respond e.g. by sending the address of the service provider of each suitable service, or a WSDL-file or URL (Uniform Resource Locator) associated with each service, to the service requester.

The information that is stored in the UDDI server about a service will generally include such data as the name of the company that provides the service, the type of the service and information required for connecting to the service (e.g. a URL). The information may also include QoS information such as the capacity of the Web service, i.e. the number of simultaneous requests that can be supported, information on robustness of the Web service and information relating to the performance of the Web service. The W3C document "QoS for Web Services: Requirements and Possible Approaches" http://www.w3c.or.kr/kr-office/TR/2003/ws-qos/ describes QoS requirements for web services.

The US patent application US 2005/0235053 discloses a method and mechanisms for searching for Web services that makes it possible for a service requester to receive a list of possible services along with information on the service history of each service. The service requester can then select a service from the list based on the received information. For this purpose the service provider will collect information regarding the delivered quality of service in the past, i.e. the service history resulting from actual operation of the service and provide this information to the UDDI site.

However from the point of view of the service requester the prior art mechanisms for searching for Web services have drawbacks since they are not particularly focused on the interests and needs of the service requester. A service requester may have special QoS requirements for a certain service. But with the Web service solutions that are available today it is difficult for the service requester to find a Web service that fulfils his/her requirements. For example, a service requester may want to use a Web service to set up a multimedia session between two end users. The requester has certain QoS requirements for the session such as transmission rate, packet loss, transmission delay and jitter delay. With the Web service solutions that are described in the above mentioned W3C document and US patent application the service requester may be able to receive some information either relating to the capacity of a web service in general or information relating to the QoS that the service has been able to provide in the past, but this will not give the requester any information on the QoS that the requester will receive for his/her session. The capacity of a Web service is changing dynamically depending on the number of currently ongoing sessions and their QoS requirements. The service that historically has provided the best QoS may not be the best choice for the requester at the time he/she wishes to set up the multimedia session due to a very large number of ongoing sessions at that time. If there are several service providers, the service requester wants to get the service from the service provider who can best satisfy his/her QoS requirements. The service requester will probably not be interested in general QoS requirements such as the number of simultaneous requests that can be supported. He/she will mainly be interested in what the best quality of service is that he/she can get for the moment from the service provider.

SUMMARY

As mentioned above the Web service solutions that are available today are not focused on QoS support from the viewpoint of the service requester. An object of the present invention is therefore to provide methods and arrangements for supporting dynamic QoS requirements in Web services.

The above stated object is achieved by means of a UDDI server and a method in a UDDI server according to the present invention.

A first embodiment of the present invention provides a UDDI server for mediating Web services provided by a number of service providers to a number of service requesters. The UDDI server comprises a Web service register for storing information associated with the Web services. The Web service register includes data sets for storing QoS status information associated with each Web service respectively. The QoS status information is information on the current QoS that the associated Web service can offer to a service requester. The UDDI server also comprises means for updating the QoS status information stored in the data sets periodically based on dynamic service status information received from the service providers.

A second embodiment of the present invention provides a method in a UDDI server for mediating Web services provided by a number of service providers to a number of service requesters. The method comprises a step of registering at least one Web service in the UDDI server. This registering step includes storing information associated with each Web service, which information includes QoS status information associated with each Web service. The QoS status information is information on the current QoS that the associated Web service can offer to a service requester. Furthermore the method comprises a step of updating the stored QoS status information periodically based on dynamic service status information received from the service provider of each Web service respectively.

Further embodiments of the present invention provide a method and UDDI server for selecting a Web service that satisfy QoS requirements of a service requester in response to a service request.

An advantage of the present invention is that it allows for Web service mediation that takes dynamic QoS into account. The present invention provides support for QoS provisioning that makes it is possible for a UDDI server to provide better service to service requesters by matching the service providers with Web services that satisfy the service requesters' requirements.

Another advantage of the present invention is that it provides a tool for better resource management of the resources of service providers. According to the present invention service requests may be better distributed between different service providers since the different service providers' capacity may be taken into account. Thereby it is possible to avoid overloading a service provider with no available capacity with service requests and instead steer the service requests to service providers with capacity available. This will probably be better for all parties, since giving poor quality of service or no service at all to a service requester may damage a service provider's reputation.

A further advantage of an embodiment of the present invention is that it may provide for faster delivery of a Web service since unnecessary requests for Web services may be avoided. This is possible since the UDDI server according to an embodiment of the present invention is able to give a service requester information about Web services that satisfy the service requester's QoS requirements. Thereby the service requester may avoid making requests to Web services that cannot support the service requester's requirements.

Yet a further advantage of an embodiment of the present invention is that a possibility to customize requests for Web services through a preference register may be provided.

Further advantages and features of embodiments of the present invention will become apparent when reading the following detailed description in conjunction with the drawings.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Figure 1:
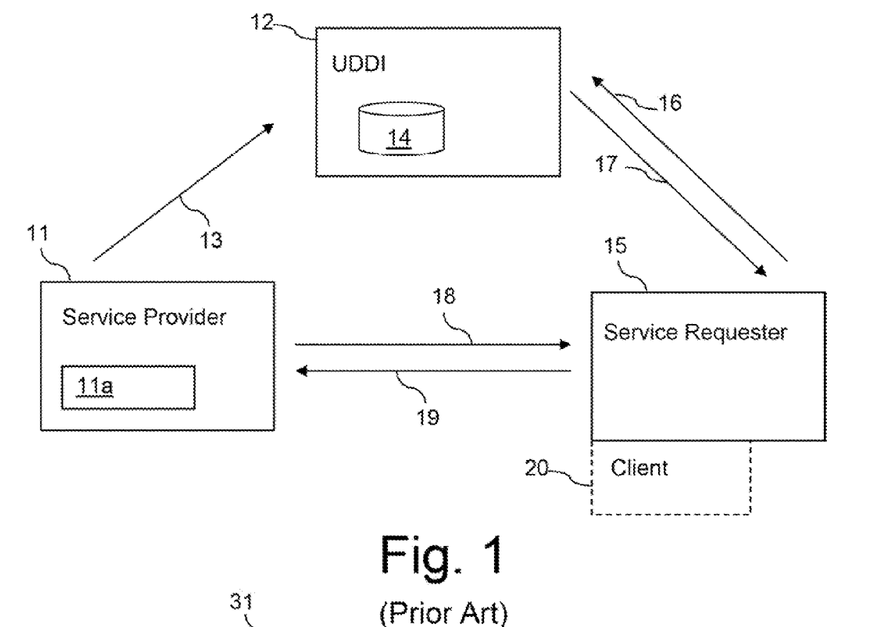
FIG. 1 is a schematic block diagram illustrating a common system architecture for realizing a Web service.

A common architecture for realizing a Web service is illustrated schematically in FIG. 1. A service provider 11 has implemented a Web service 11a that is open for use by others via a network such as the Internet. In order to promote the Web service, the service provider registers the Web service 11a with a UDDI server 12, which acts as a Web service broker. The registration step 13 may include that the service provider transmits information such as the name of the service provider, the type of service and information required for accessing the service. It is also possible that the service provider transmits a WSDL-file describing the Web service to the UDDI server. The UDDI server 12 stores the information that it has received about the Web service 11a from the service provider 12 along with information regarding other Web services provided by other service providers in a Web service register 14. A service requester 15 who wishes to use a certain type of Web service may find suitable services by sending a search request 16 to the UDDI server 12. Assume for instance that the service requester would like to book an air ticket on-line, that the Web service 11a is a travel booking service and that the service provider 12 e.g. is a travel agency. The search request 16 will then indicate that the service requester would like to search for a travel booking service. The UDDI server will check the Web service register 14 for travel booking services and return information regarding any registered travel booking services in a search response 17. In this case the UDDI server 12 will send information regarding the Web service 11a and possibly also about other travel booking services registered with the UDDI server in the search response 17. The search response may for instance include such information as the name of the service provider, a URL for accessing the service or a WSDL-file, depending on what type of information the UDDI server has stored for the particular Web service. The search response 17 may be followed by the service requester 15 connecting 18 to the service provider 11 to request use of the Web service 11a. The service provider 11 may then respond 19 by sending a WSDL-file to the service requester 15 that provides the service requester with all the information that is needed to use the service. In this case the WSDL-file may e.g. specify the parameters such as desired departure time, destination and airline that the service requester should send when using the Web service 11a. Based on the information in the WSDL-file a Web service client 20 may be set-up at the service requester 15. In case the service requester has received the WSDL-file describing the service already from the UDDI server 12, then the service requester can start using the Web service directly without contacting the service provider first to receive the WSDL-file.

It should be noted that there are several different ways of realizing Web services and that FIG. 1 and the description above merely constitutes one example.

As mentioned above the Web service solutions that are available today are not focused on QoS support from the viewpoint of the service requester. However embodiments of the present invention provide a method and UDDI server for supporting dynamic QoS requirements in Web services.

Figure 2:
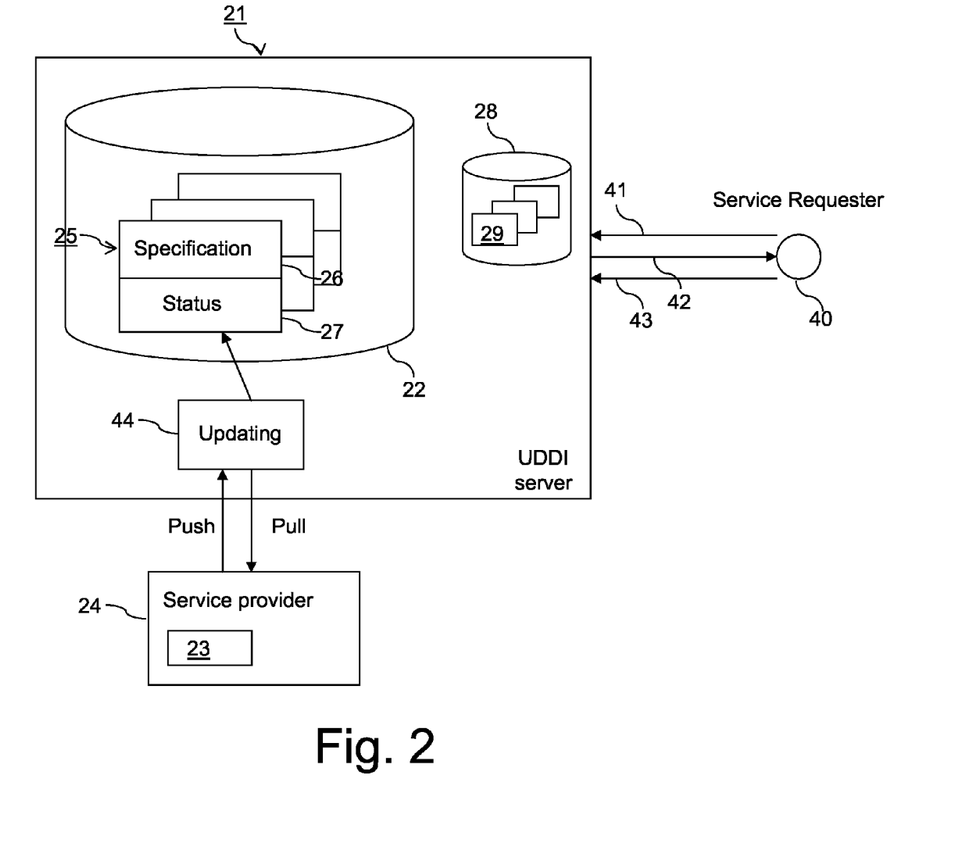
FIG. 2 is a schematic block diagram illustrating a system architecture for realizing a Web service according to an embodiment of the present invention.

FIG. 2 is a schematic block diagram illustrating a UDDI server 21 according to an embodiment of the present invention. The UDDI server comprises a Web service register 22 in which information regarding Web services 23 provided by different service providers 24 are stored. The Web service register has one record 25 for each Web service that is registered with the UDDI server. Each record 25 includes a service specification 26, which is a data set that contains data about the service that is fairly static, such as the type of the service, the name of the service provider, a URL to the service etc. A record in the Web service register according to this embodiment of the present invention will also include a service status data set 27 that contains QoS status information relating to the current QoS that the associated Web service can offer to a service requester. In contrast to the data stored in the service specification 26, the data that is stored in the service status data set 27 will generally be highly dynamic. For a Web service for call set-up of a HSDPA-connection the service status data set 27 may for instance include such data as the current transmission rate that can be provided by the Web service. This transmission rate depends on the number of simultaneously ongoing sessions and will therefore change as the load of the Web service changes.

The QoS status information stored in the service status data sets is periodically updated based on updated information received from the different service providers. These updates may take place e.g. in response to reception of a periodic automatic push message from the service provider or by means of a periodic active pull by the UDDI server. The mode by which the updated dynamic QoS status information is transported to the UDDI server may depend on the Web service. As an example push may be used for updating the QoS status information for popular Web services that are often requested while pull is used for updating of seldom requested services for which the QoS status update is not so critical. But many different schemes for transporting the updates to the UDDI server are possible and the one that is implemented is matter of choice. The QoS status information may e.g. be carried in SOAP messages between the different service providers and the UDDI server.

The UDDI server 21 may optionally also include a QoS model register 28. The QoS model register includes a number of pre-defined QoS models 29. The QoS models each specifies a number of QoS parameter fields and represent a QoS profile of a Web service. The QoS models may serve as templates for the service status data sets 27. Using a QoS model register with a set of pre-defined QoS models will simplify the handling of the service status data sets 27.

Figure 3A:
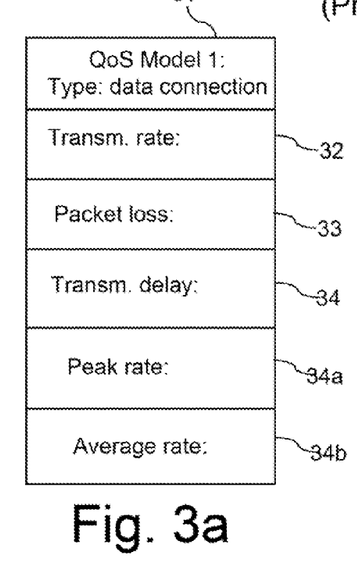
FIG. 3a is a schematic block diagram illustrating a first example of a QoS model according to an embodiment of the present invention.
Figure 3B:
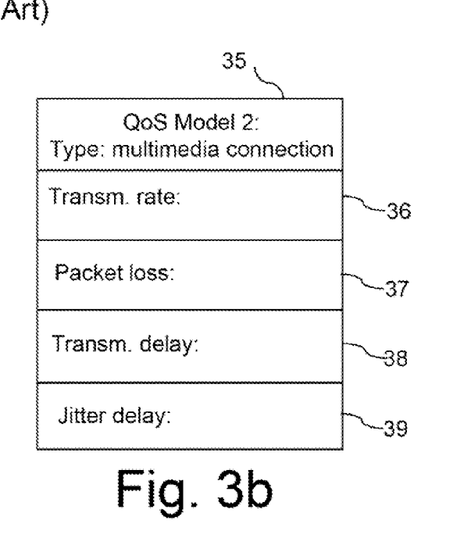
FIG. 3b is a schematic block diagram illustrating a second example of a QoS model according to an embodiment of the present invention.

As mentioned, each entry (i.e. each QoS model) in the QoS model register 28 has a number of fields that represent the QoS profile of a Web service. Two examples of QoS models are illustrated in FIGS. 3a and 3b. FIG. 3a illustrates a QoS model 31 that is particularly adapted for describing the QoS profile of a service for setting up a data connection. The QoS model 31 comprises fields 32, 33, 34, 34a and 34b for storing transmission rate, packet loss, transmission delay, peak rate and average rate. FIG. 3b illustrates a QoS model 35 that is particularly adapted for describing the QoS profile of a service for setting up a multimedia session. The QoS model 35 comprises fields 36, 37, 38 and 39 for storing transmission rate, packet loss, transmission delay, and jitter delay. The QoS parameters used will accordingly depend on the type of Web service. Some other examples of QoS parameters that may be relevant are maximum rate, average rate, minimum rate, resolution, sampling rate, etc. or parameters relating to the quality of audio, video and data.

It is possible that the same QoS model is used by many different services. The use of the same QoS model will make it easier to compare Web services of the same type. It is also possible for a Web service to be associated with several QoS models if the Web service corresponds to a combination of several different types of services.

If a QoS model register 28 is used it is preferable that, when a new service is registered at the UDDI server 21, it has to be associated with at least one QoS model 29. If none of the QoS models fits the service, a new QoS model can be created and stored in the QoS model register 28. This should preferably be done in a controlled way by the UDDI server.

Services 23 which do not guarantee QoS requirements may be associated with a NULL entry in the QoS model register 28.

Once a service is registered and a QoS model is selected, the UDDI server will create the service status data set 27 for QoS monitoring using the selected QoS model as a template. The service status data set 27 is linked to the registered service. As mentioned above the content of the service status data set 27 will be updated dynamically based on information that is received periodically or upon request from the provider of the Web service. The content of the service status data set will indicate the highest QoS requirements that currently can be supported by the associated Web service.

When QoS models are used the equipment of a service requester 40 may be adapted to directly include a set of QoS requirements in a service request 41. Alternatively the service requester may send a service request to the UDDI server for a particular type of service without QoS requirements and the UDDI server may respond to the service request by sending the service requester a message 42 including a QoS model that corresponds to the requested service type in order to indicate what QoS parameters the service requester may specify in a set of QoS requirements. The service requester will then respond by specifying the desired QoS requirements in a response message 43 and the UDDI server 21 will start looking for a suitable service after having received the desired QoS requirements from the service requester 40.

It will be apparent for the person skilled in the art from the description above that implementation of the present invention will require some adaptation of a UDDI server according to prior art. The natural choice is to implement the present invention by providing the UDDI server with new software, although implementations in firmware, hardware or combinations thereof are also feasible. The UDDI server 21 will e.g. have to be adapted so that the Web service register is arranged to store the QoS status information. The UDDI server will also have to be provided with means for communicating with the service providers to receive and update the QoS status information. Such updating means are schematically illustrated in FIG. 2 and denoted by reference numeral 44. The updating means would generally be implemented in software and would probably be arranged use an already existing interface for communicating with the service providers.

Apart from adaptations in the UDDI server, some adaptation of the equipment of the service providers may also be required since the service provider should be able to provide the UDDI server with the service status information and periodically send updates of this information to the UDDI server. Furthermore the service providers should also have the necessary means to keep track of their own QoS status for instance in terms of their current available capacity. It may also be necessary to adapt the equipment of the service requesters somewhat. According to embodiments of the present invention the service requesters should have the means for communicating QoS requirements to the UDDI server. If QoS models are used the service requester should e.g. be able to obtain QoS models and present QoS requirements to correspond with an appropriate QoS model. Such adaptations would generally be made in software as is apparent for the person skilled in the art.

Figure 4:
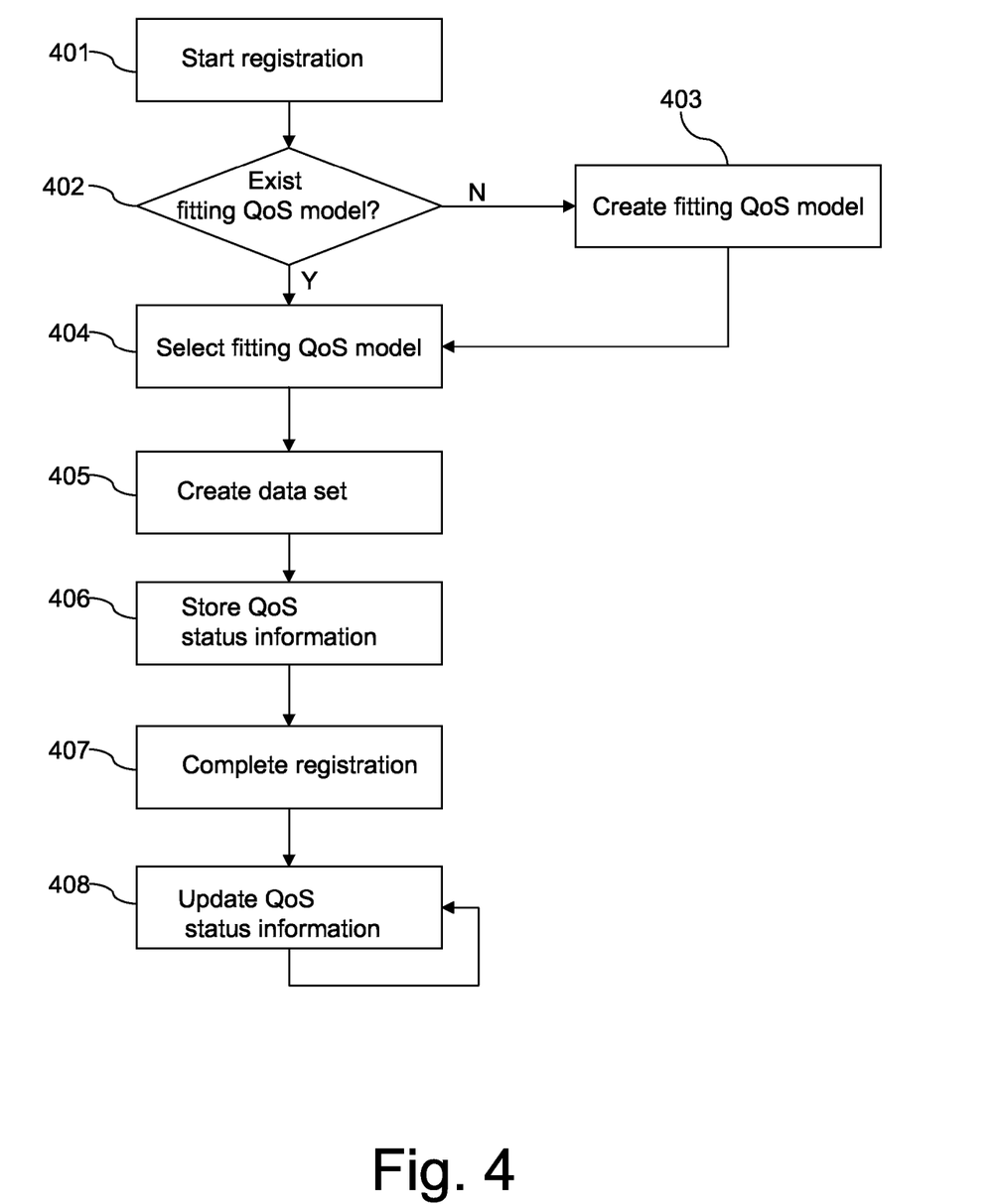
FIG. 4 is a flow chart illustrating an embodiment of a method in a UDDI server according to the present invention.

FIG. 4 is a flow chart that illustrates an embodiment of a method in a UDDI server according to the present invention. In a step 401 registration of a new Web service in the Web service register is started. This may be initiated by the UDDI receiving a registration request from a service provider. According to this embodiment the method then continues with a step 402 in which the QoS model register is searched to see if there is a pre-defined QoS model that fits the Web service to be registered. If no fitting QoS model is found a fitting QoS model is created and stored in the QoS model register, step 403. The fitting QoS model is selected to be associated with the Web service in a step 404. In a step 405 a service status data set is created for the Web service based on the selected QoS model. QoS status information provided from the service provider is then stored in the service status data set, step 406. Thereafter the registration of the Web service is completed, which among other things could involve storing the above mentioned service specification of the Web service in the Web service register, step 407. When the registration is completed the method will continue with an updating step 408 in which the stored QoS status information of the service is periodically updated based on dynamic service status information received from the service provider either by means of active pull initiated by the UDDI server or by means of a periodic push initiated by the service provider.

The above mentioned features of adapting the UDDI to store and monitor QoS status information regarding the current QoS that Web services can offer to service requesters will make it possible for the UDDI to provide better service request responses to the service requesters. However the UDDI may be able to provide even better service to service requesters and service providers if a number of additional features are implemented in the UDDI server as is illustrated in FIG. 5 and will be described below.

Figure 5:
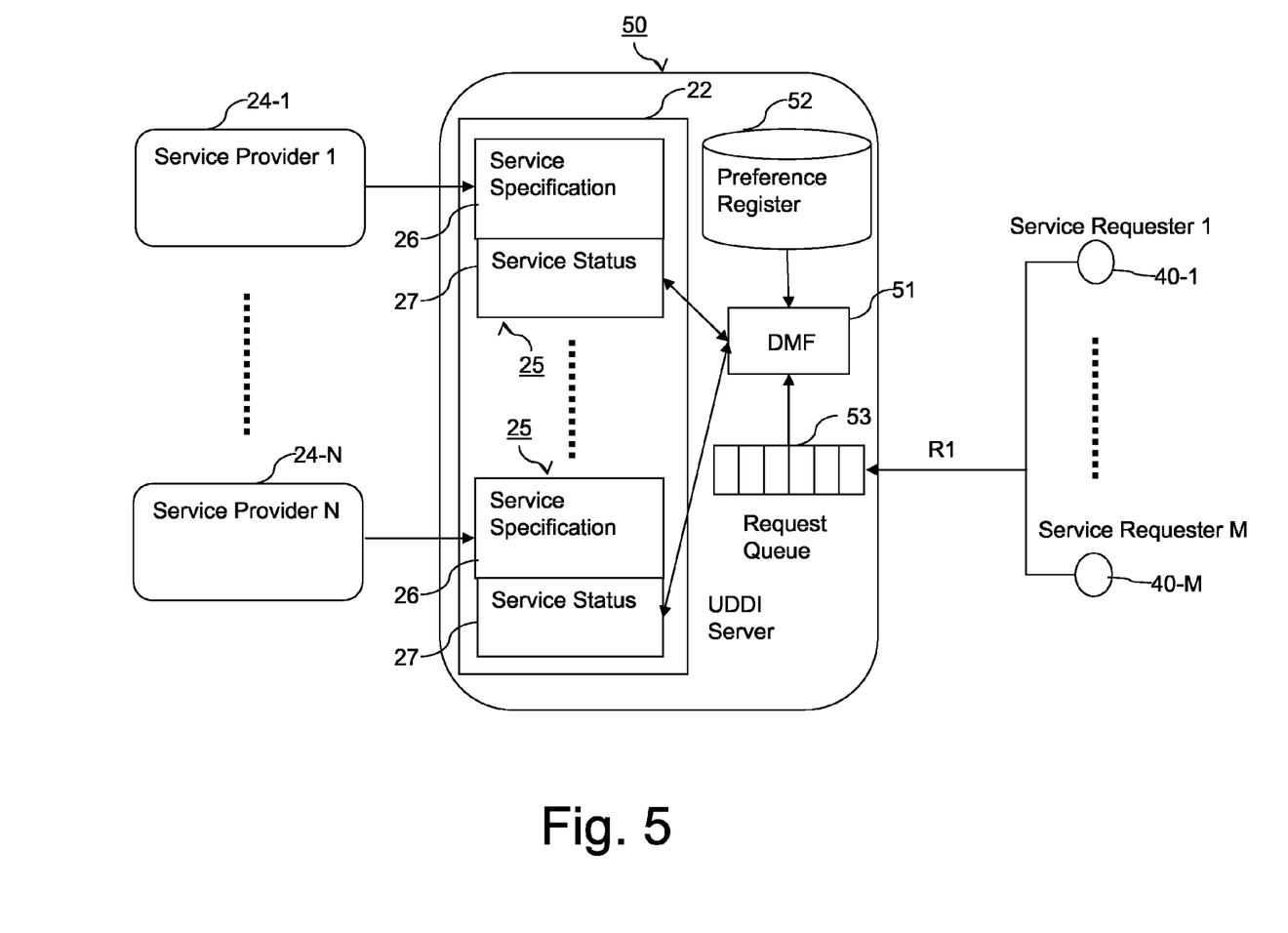
FIG. 5 is a schematic block diagram illustrating a system architecture for realizing a Web service according to an alternative embodiment of the present invention.

FIG. 5 is a schematic block diagram of a UDDI sever 50 according to an alternative embodiment of the present invention. The UDDI server 50 comprises a Web service register 22, that lists a number of Web services provided by different Web service providers 24-1, ..., 24-N. A number of service requesters 40-1, ..., 40-M may contact the UDDI in order to find a desired Web service. The Web service register 22 comprises a record 25 for each registered Web service, which each comprises a service specification 26 and a service status data set 27 with content that is dynamically updated as described above. According to this embodiment of the present invention the UDDI server 50 also comprises a decision making function (DMF) 51. The DMF 51 is arranged to use the QoS status information stored in the service status data sets 27 and QoS requirements provided by a service requester to choose a Web service for the service requester.

When the UDDI receives a service request R1 from e.g. service requester 40-1 for a desired type of service along with a set of QoS requirements, the DMF 51 will process the service request and select a Web service from the Web services of the desired type that are registered in the Web service register so that the current QoS that the selected Web service can offer, as indicated by the QoS status information stored in the associated service status data set 27 fulfills the set of QoS requirements. The UDDI will then send information about the selected Web service to the service requester in a service request response message. Thereby, instead of receiving a list of possible Web services from the UDDI the service requester would receive information about a single Web service that is known to fulfill the QoS requirements of the service requester. From the service requesters point of view this is thought to be very attractive, compared to the prior art solutions, since it spares the service requester the trouble of possibly having to choose between a plurality of Web services. According to the prior art solutions the service requester would not even know if the Web services that the UDDI has sent information about are suitable or not since no information regarding the Web services capability of fulfilling the QoS requirements of the service requester were provided according to the prior art.

The UDDI server 50 illustrated in FIG. 5 may optionally also comprise a preference register 52. In the preference register 52 more static preference information about the service requesters 40-1, ..., 40-M and/or service providers 24-1, ..., 24-N may be stored. The preference information stored in the preference register is usually not service request specific. It could be ratings from others, preferred charging schemes, preferred service providers/requesters, weights on QoS parameters, etc. It is not excluded that actual QoS requirements also may be stored in the preference registry if e.g. a service requester always requests the same service with the same QoS requirements. But the QoS requirements are normally not stored in the preference registry. The service requesters can continuously update the preference register depending on e.g. pricing policy, previously received service, etc.

If a preference register 52 is used the DMF should be adapted to take the relevant preference information stored in the preference register into account when selecting a Web service as will be explained in further detail below.

The UDDI server 50 may furthermore optionally comprise one or several request queues 53. One request queue for each type of Web service registered in the UDDI may be provided. The service requests for a specific type of Web service may be put in the request queue associated with the specific type of Web service if there is currently no capacity available for the registered Web services such that the preferences and/or QoS requirements associated with the service requests can be fulfilled. The service requests are placed in the request queue to wait for available capacity.

The DMF of the UDDI server 50 is preferably arranged to base its selection of a Web service on not only the QoS requirements and the QoS status information of the registered Web services, but also on any stored preference information relating to the service requester and/or service providers and the request queue status. The DMF is not limited to any specific type of decision making or selection algorithm. There are many different algorithms that may be used. When there are several suitable Web services to choose from it is for instance possible to use an algorithm that selects the Web service with the largest capacity, a random selection algorithm or a round robin mechanism.

Figure 6:
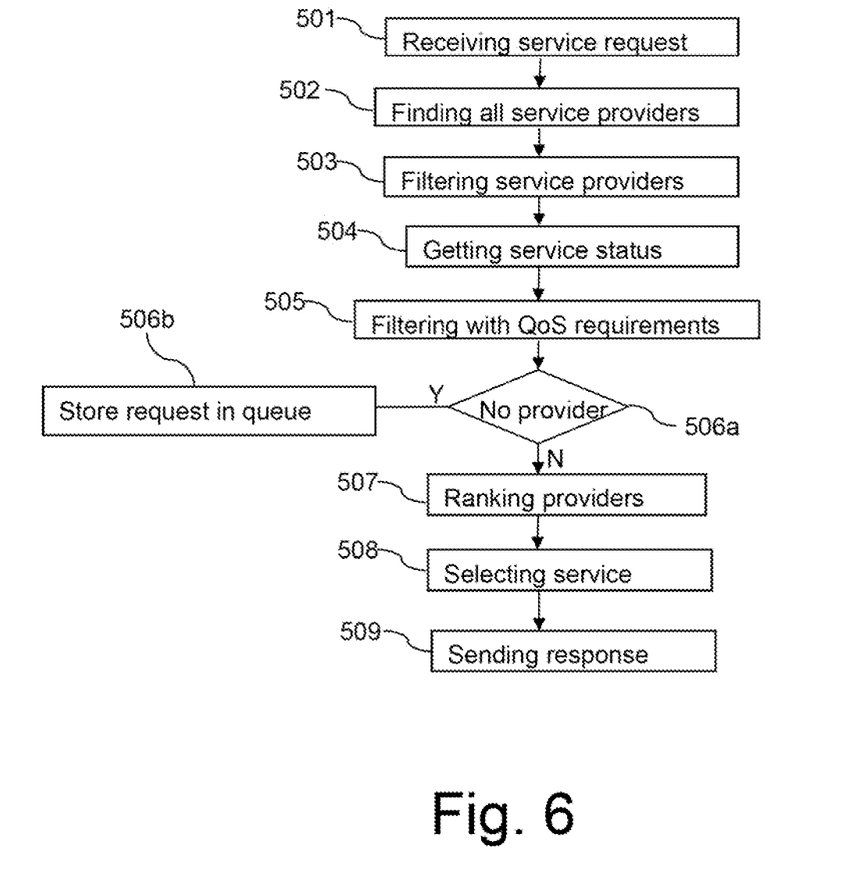
FIG. 6 is a flow chart illustrating a method in a UDDI server such as the UDDI server illustrated in FIG. 5 according to an embodiment of the present invention.

FIG. 6 is a flow chart illustrating an example of a method in a UDDI server such as the UDDI server 50 according to an embodiment of the present invention. FIG. 6 illustrates how a suitable Web service may be selected for a service request. In a step 501, a service request is received. The request is processed immediately even if the request queue is not empty, because there are numerous reasons to store a service request in the queue. A new service request should be checked first. In a step 502, the DMF of the UDDI server will find all Web services provided by different service providers which can provide the requested type of service. The Web services found in the step 502 are herein referred to as a first set of Web services. In a step 503, a first filtering of the first set of Web services is done by the DMF using the information in preference register 52. This step will e.g. remove those Web services provided by service providers that the preference information of the preference register indicates should never be used for the current service requester no matter what the status of the Web service is. The remaining set of Web services is herein referred to as a second set of Web services and is temporarily saved for the service request. In a step 504, the QoS status information which is associated with the Web services of the second set and stored in the Web service register is acquired by the DMF. The second set is once again filtered in step 505 using the QoS requirements from the service requester to derive a third set of Web services which includes those Web services that according to their associated QoS status information fulfill the QoS requirements. If in a step 506*a* it is found that the third set is empty, the service request is stored in the request queue 53 in a step 506*b*. Otherwise, according to this embodiment, the Web services will be ranked using the preference information in the preference register 52 in a step 507. The parameters used in the ranking could be pricing, credibility, relations between requester and provider, weighting of QoS parameters, etc. If several Web services have the same highest ranking, there are many algorithms that can be used to make a choice. A very simple one is random selection. One of the Web services with the highest ranking will be chosen randomly. The round robin method could also be used, i.e. the Web services will be chosen by turns. A little more advanced algorithm will take consideration of the current available capacities of the Web services. The Web service with the highest available capacity may be chosen so that the load can be evenly distributed over all Web services. Even information on current requests in the request queue 53 can be used in the decision making. If there are requests waiting for a particular Web service to gain enough capacity, that particular Web service can be avoided for other service requests if there are other Web services available with the same ranking. There are numerous algorithms that can be used in the DMF. However, in a step 508 a Web service is selected by the DMF according to some decision making algorithm. In a step 509 a service request response is sent to the service requester with information about the selected Web service.

Figure 7:
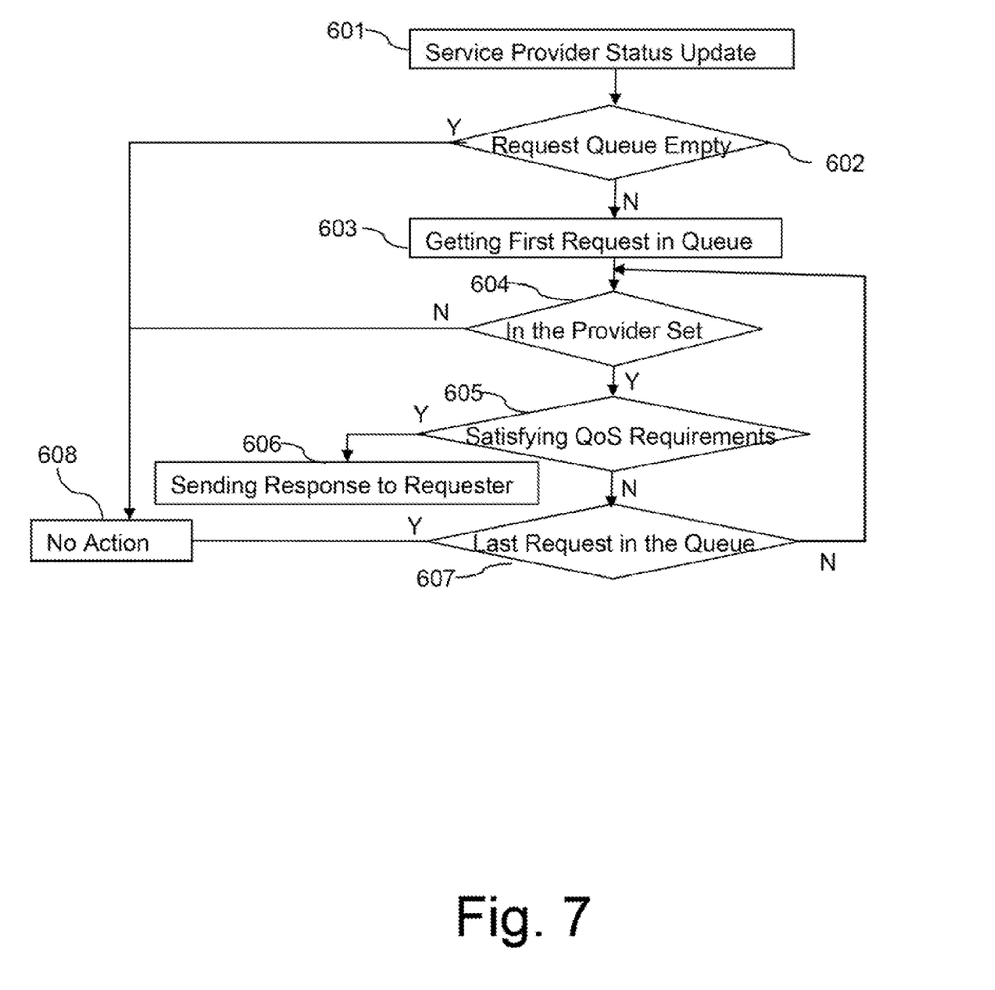
FIG. 7 is a flow chart illustrating a method for managing a request queue in a UDDI server according to an embodiment of the present invention.

If one or several request queues are used there are several different ways of managing the requests in the request queue. A new check to see if any of the service requests in the request queue may be fulfilled may e.g. be made at pre-determined intervals. An alternative is to perform a check when the QoS status information is updated for a Web service of the type that the request queue is associated with. FIG. 7 is a flow chart illustrating such an embodiment. FIG. 7 illustrates an example of how the DMF 51 may manage the request queue 53 when QoS status information about a Web service is updated. In a step 601, the QoS status information of a Web service is updated.

(Supposedly an increase in the capacity, but there may be several QoS parameters, maybe some increase and others decrease. According to this embodiment, the check is made for every service status update.) In a step 602, the request queue 53 associated with the type of service for which the update was made is checked. If the request queue is empty, there will be no action, step 608. Otherwise, the first service request in the request queue is taken for processing in a step 603. In a step 604, the DMF checks if the Web service is in the above mentioned second set of Web services created when the request was received as described above in connection with step 503 of FIG. 6. If it is not in the second set, no action is taken, step 608. Otherwise, the process proceeds to a step 605 where the QoS requirements are checked against the updated QoS status information. If the Web service can satisfy the QoS requirements, the Web service is selected and a service request response is sent back to the requester in a step 606. Otherwise, the process will continue to get the next request in the queue in a step 607 and then a repeat of process steps will start at step 604. If the service request was the last request in the request queue 53, no action is taken, step 608.

According to the above described embodiments of the present invention a service provider that provides a Web service with large capacity is more likely to be assigned to the service requesters. The present invention may also provide the possibility of a new business opportunity for a provider of a UDDI server. The provider of the UDDI server may for instance provide a service level scheme in which service providers may pay a fee to the UDDI server provider to have their service ranked as a premium level service in the UDDI server. If there are several Web services to choose from that can fulfill the QoS requirements, the UDDI may be arranged to always choose a premium level service prior to any other Web services with a lower level in the service level scheme.

As mentioned above, prior art UDDI servers provide only a service lookup service without support for QoS provisioning. Embodiments of the present invention on the other hand provides such support for QoS provisioning and may also provide a tool for efficient resource management. Since the UDDI server acts as a broker for web services, it is desired for the broker to provide the best possible service for both service provider and service requester. The service requester wants to get services which can satisfy the QoS requirements of the service requester. The service provider's goal is to maximize its system resources and provide services to as many satisfied user as possible. This is made possible by means of embodiments of the present invention.

From the description above the person skilled in the art will realize what software, firmware and/or hardware modifications are necessary and/or suitable in order to implement the different described embodiments of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A Universal Description, Discovery and Integration (UDDI) server for mediating Web services provided by a plurality of service providers to a plurality of service requesters, which UDDI server comprises:

a computer memory that stores a Web service register, the Web service register being configured to store information associated with said Web services, wherein said Web service register includes data sets storing Quality of Service (QoS) status information associated with each Web service respectively, which QoS status information is information on the current QoS that the associated Web service offers to a service requester; and means for updating said QoS status information stored in said data sets periodically based on dynamic service status information received from said plurality of service providers, wherein the computer memory further stores a QoS model register including a plurality of pre-defined QoS models each of which specifies a different set of QoS parameter fields, wherein each QoS model is selectable for association with at least one of the Web services and, when selected for association with the at least one Web service, each QoS model defines which QoS parameters the Web service register is to store in the QoS status information data set associated with the at least one Web service.

2. The UDDI server according to claim 1, wherein said plurality of QoS parameter fields includes a field for at least one of the following QoS parameters: transmission rate, packet loss, transmission delay, jitter delay, maximum rate, minimum rate, average rate, resolution, or sampling rate.

3. The UDDI server according to claim 1, wherein the Web service register is configured to associate a first Web service to be registered with at least one of the pre-defined QoS models to create a first data set associated with the first Web service that contains the plurality of QoS parameter fields specified by the at least one of the pre-defined QoS models.

4. The UDDI server according to claim 1, wherein the QoS model register is configured to register a new QoS model if none of the existing predefined QoS models fits a second Web service to be registered in the Web service register and wherein the Web service register is configured to associate the second Web service with the new QoS model to create a second data set associated with the second Web service.

5. The UDDI server according to claim 1, wherein said means for updating said QoS status information is configured to update the QoS status information of one of said data sets when the UDDI server receives dynamic service status information relating to the data set in a pushed message from the service provider of the Web service associated with the data set.

6. The UDDI server according to claim 1, wherein said means for updating said QoS status information is configured to periodically pull a service provider of one of said Web services in order to request dynamic service status information relating to the Web service and to update the QoS status information stored in the data set associated with the Web service based on the received dynamic service status information.

7. The UDDI server according to claim 1, wherein said means for updating said QoS status information is configured to update the QoS status information of one of said data sets based on service status information that is delivered from the service provider of the Web service associated with the data set either as pushed information or as information that is pulled periodically by the UDDI server and wherein the UDDI server is configured to adapt the mode of delivery of the service status information depending on the type of the Web service.

8. The UDDI server according to claim 1, the UDDI server further comprising a Decision Making Function which is configured for;

processing service requests from said service requesters which service requests each are associated with a set of QoS requirements; and selecting a Web service from said Web services registered in said Web service register for each service request respectively such that the current QoS that the Web service offers as indicated by the QoS status information stored in the data set associated with the Web service, fulfills the set of QoS requirements associated with the service request.

9. The UDDI server according to claim 8, further comprising a preference register in which preference information regarding preferences of said service requesters or service providers may be stored, and wherein the Decision Making Function is further configured for selecting the Web service such that it also matches the preference information of the service requester and/or service provider that is stored in said preference register.

10. The UDDI server according to claim 9, wherein said preference information includes one or more of the following types of information:

information regarding Web service ratings, preferred charging schemes, preferred service providers or requesters, not accepted service providers or requesters, weights on QoS requirements, or QoS requirements.

11. The UDDI server according to claim 8, wherein the UDDI server further comprises at least one request queue in which service requests are stored if there is no Web service available that fulfills the QoS requirements associated with the service request.

12. The UDDI server according to claim 9, further comprising at least one request queue in which service requests are stored if there is no Web service available that fulfills the QoS requirements associated with the service request and that also matches the preference information of the service requester or service provider that is stored in said preference register.

13. The UDDI server according to claim 8, wherein the Decision Making Function is further configured for checking the status of said request queue prior to selecting a Web service and for selecting a Web service such that as many service requests as possible stored in said request queue may be fulfilled.

14. The UDDI server according to claim 8, wherein the Decision Making Function is configured for selecting a Web service based on a decision algorithm when there are several Web services that are possible to select.

15. A method in a UDDI server for mediating Web services provided by a plurality of service providers to a plurality of service requesters, the method comprising the steps of:

registering at least one Web service in the UDDI server, the registering step including storing information associated with each Web service, the information including QoS status information associated with each Web service, which QoS status information is information on the current QoS that the associated Web service offers to a service requester; and updating said stored QoS status information periodically based on dynamic service status information received from the service provider of each Web service respectively, wherein said registering step further includes:

selecting a QoS model for each Web service to be associated with, from a QoS model register including a plurality of pre-defined QoS models, each QoS model specifying a different set of QoS parameter fields that define which QoS parameters to store as part of the QoS status information associated with a corresponding one of the Web services, creating a data set for each Web service, the data set comprising the QoS parameter fields specified by the selected QoS model, and mapping said QoS status information into said data set.

16. The method according to claim 15, wherein said registering step further includes searching for a QoS model that fits the type of each Web service respectively in a QoS model register that includes a plurality of pre-defined QoS models, each model specifying a plurality of QoS parameter fields, if a fitting QoS model is found for a first Web service, selecting the fitting QoS model to be associated with the first Web service;

creating a data set for the first Web service with the selected fitting QoS model as a template; and mapping said QoS status information associated with the first Web service into said data set, and if no fitting QoS model is found for the first Web service, defining a new QoS model that fits the type of the first Web service registering the new QoS model in the QoS model register;

selecting the new QoS model to be associated with the first Web service;

creating a data set for the first Web service with the selected new QoS model as a template; and mapping said QoS status information associated with the first Web service into said data set.

17. The method according to claim 15, wherein said step of updating said QoS status information comprises receiving periodically the dynamic service status information in a pushed message from the service provider of the Web service.

18. The method according to claim 15, wherein said step of updating said QoS status information comprises periodically pulling the dynamic service status information from the service provider of the Web service.

19. The method according to claim 15, further comprising the steps of:

receiving a service request from one of said service requesters which service request is associated with a set of QoS requirements; selecting one of said at least one Web services registered in the UDDI server, the selecting step including comparing said set of QoS requirements to the QoS status information stored in the UDDI and selecting the one Web service such that the current QoS that the one Web service offers, as indicated by the QoS status information associated with the one Web service, fulfills the set of QoS requirements associated with the service request, and sending information about the one selected Web service to the service requester from which the service request was received in a response message.

20. The method according to claim 19, wherein said selecting step further includes searching through said at least one Web service registered in the UDDI to find a first set of Web services that correspond to the type of Web service requested in then service request, and filtering said first set of Web services using preference information, the preference information being information which has been pre-stored in the UDDI server regarding the preferences of the service requester from which the service request was received, in order to derive a second set of Web services that comply with said preference information, wherein the one Web service is selected from said second set of Web services.

21. The method according to claim 20, wherein said selecting step further includes filtering said second set of Web services by comparing said set of QoS requirements to the QoS status information stored in the UDDI to derive a third set of Web services each being associated with QoS status information that indicates that each Web service respectively would fulfill the set of QoS requirements, wherein the one of the at least one Web services is selected from said third set of Web services.

22. The method according to claim 19, wherein then service request is stored in a request queue if there is no suitable Web service found in said selecting step.

* * * * *

UNITED STATES PATENT AND TRADEMARK OFFICE
CERTIFICATE OF CORRECTION

PATENT NO. : 9,197,708 B2
APPLICATION NO. : 12/530950
DATED : November 24, 2015
INVENTOR(S) : Huang It is certified that error appears in the above-identified patent and that said Letters Patent is hereby corrected as shown below:

In the Specification

In Column 4, Line 36, delete "provider 12" and insert -- provider 11 --, therefor.

In Column 4, Line 43, delete "provider 12" and insert -- provider 11 --, therefor.

In Column 7, Line 52, delete "sever" and insert -- server --, therefor.

In the Claims

In Column 11, Line 20, in Claim 2, delete "afield" and insert -- a field --, therefor.

In Column 11, Line 64, in Claim 8, delete "for;" and insert -- for: --, therefor.

In Column 12, Line 36, in Claim 13, delete "claim 8," and insert -- claim 12, --, therefor.

In Column 13, Line 20, in Claim 16, delete "service" and insert -- service; --, therefor.

Signed and Sealed this
Twelfth Day of July, 2016

Michelle K. Lee
*Director of the United States Patent and Trademark Office*